US011381138B2

(12) United States Patent
Blum et al.

(10) Patent No.: US 11,381,138 B2
(45) Date of Patent: Jul. 5, 2022

(54) COOLING CAP FOR A STATOR OF AN ELECTRICAL MACHINE OF A MOTOR VEHICLE, STATOR AND MOTOR VEHICLE

(71) Applicant: Bayerische Motoren Werke Aktiengesellschaft, Munich (DE)

(72) Inventors: Julian Blum, Munich (DE); Andreas Huber, Schoenberg (DE); Jerome Ragot, Munich (DE); Jens Richter, Neubiberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 246 days.

(21) Appl. No.: 16/849,563

(22) Filed: Apr. 15, 2020

(65) Prior Publication Data

US 2020/0244145 A1 Jul. 30, 2020

Related U.S. Application Data

(63) Continuation of application No. PCT/EP2018/076200, filed on Sep. 27, 2018.

(30) Foreign Application Priority Data

Nov. 22, 2017 (DE) ..................... 10 2017 220 856.2

(51) Int. Cl.
*H02K 9/22* (2006.01)
*H02K 3/38* (2006.01)
*H02K 9/19* (2006.01)

(52) U.S. Cl.
CPC ................. *H02K 9/22* (2013.01); *H02K 3/38* (2013.01); *H02K 9/19* (2013.01)

(58) Field of Classification Search
CPC .. H02K 3/38; H02K 1/20; H02K 9/19; H02K 9/197; H02K 3/34; H02K 5/20;
(Continued)

(56) References Cited

U.S. PATENT DOCUMENTS

2002/0047480 A1 4/2002 Heim
2009/0273254 A1 11/2009 Heim
(Continued)

FOREIGN PATENT DOCUMENTS

DE 100 41 330 A1 3/2002
DE 202 07 233 U1 10/2003
(Continued)

OTHER PUBLICATIONS

International Search Report (PCT/ISA/210) issued in PCT Application No. PCT/EP2018/076200 dated Jan. 4, 2019 with English translation (four (4) pages).
(Continued)

*Primary Examiner* — Quyen P Leung
*Assistant Examiner* — Alexander A Singh
(74) *Attorney, Agent, or Firm* — Crowell & Moring LLP

(57) ABSTRACT

A cooling cap for a stator of an electrical machine of a motor vehicle is provided. The cooling cap can be fitted onto an end winding of electrical windings of the stator which project beyond an axial end of a laminated core of the stator and which cooling cap is designed as a heat sink for cooling the end winding, wherein the cooling cap is formed, at least in regions, from an electrical insulating material. A stator and a motor vehicle including the cooling cap are also provided.

18 Claims, 3 Drawing Sheets

(58) Field of Classification Search
CPC ............ H02K 1/32; H02K 9/223; H02K 3/50; H02K 9/22; H02K 9/227; H02K 5/00; H02K 5/225; H02K 5/22; H02K 3/42; H02K 3/44; H02K 3/46; H02K 3/00; H02K 9/00; H02K 9/14
USPC ....... 310/71, 234, 214, 215, 208, 52, 54, 58, 310/60 R
See application file for complete search history.

(56) References Cited

U.S. PATENT DOCUMENTS

| | | | | |
|---|---|---|---|---|
| 2010/0045125 A1* | 2/2010 | Takenaka | ................. | H02K 1/20 310/54 |
| 2010/0176668 A1* | 7/2010 | Murakami | ............... | H02K 3/24 310/54 |
| 2012/0274156 A1* | 11/2012 | Chamberlin | ............. | H02K 5/20 310/58 |
| 2013/0049496 A1* | 2/2013 | Ramey et al. | ........... | H02K 5/20 310/54 |
| 2015/0288240 A1* | 10/2015 | Berndl | ................. | H02K 15/085 310/43 |
| 2018/0323685 A1 | 11/2018 | Blum et al. | | |
| 2020/0373799 A1* | 11/2020 | Cunningham | ........... | H02K 9/19 |

FOREIGN PATENT DOCUMENTS

| | | |
|---|---|---|
| DE | 10 2015 215 667 A1 | 2/2017 |
| DE | 10 2016 200 186 A1 | 7/2017 |
| DE | 10 2016 203 372 A1 | 9/2017 |
| EP | 2 113 991 A1 | 11/2009 |

OTHER PUBLICATIONS

German-language Written Opinion (PCT/ISA/237) issued in PCT Application No. PCT/EP2018/076200 dated Jan. 4, 2019 (five (5) pages).

German-language Search Report issued in German Application No. 10 2017 220 856.2 dated Jun. 29, 2018 with partial English translation (11 pages).

* cited by examiner

COOLING CAP FOR A STATOR OF AN ELECTRICAL MACHINE OF A MOTOR VEHICLE, STATOR AND MOTOR VEHICLE

CROSS REFERENCE TO RELATED APPLICATIONS

This application is a continuation of PCT International Application No. PCT/EP2018/076200, filed Sep. 27, 2018, which claims priority under 35 U.S.C. § 119 from German Patent Application No. 10 2017 220 856.2, filed Nov. 22, 2017, the entire disclosures of which are herein expressly incorporated by reference.

BACKGROUND AND SUMMARY OF THE INVENTION

The invention relates to a cooling cap for a stator of an electric machine of a motor vehicle, which cooling cap can be placed onto a winding head of electric windings of the stator which protrude beyond an axial end of a laminated core of the stator, and which cooling cap is configured as a cooling element for cooling the winding head. Moreover, the invention relates to a stator for an electric machine for a motor vehicle, and to a motor vehicle.

In the present case, interest focuses on electric machines, for example electric drive units, for motor vehicles. Electric machines usually comprise a stator and a rotor which is mounted rotatably with regard to the stator. The stator comprises a laminated core, at the axial ends of which the windings configure a respective winding head. During operation of the electric machine, power losses are produced in the form of heat, by way of which the electric machine is heated. Critical regions of the electric machine which are heated to a particularly high temperature are what are known as "hotspots" which occur, for example, on the winding heads. The heating of the electric machine can have a negative influence on the performance of the electric machine. Overheating of the electric machine can even lead to the failure of the electric machine.

In order to prevent the overheating of the electric machine, it is known from the prior art, for example from DE 10 2015 215 667 A1, to provide a liquid cooling means for the electric machine. For this purpose, end shields of the electric machine which are arranged at axial ends of the laminated core and comprise a rotary bearing for the rotor comprise cooling ducts for conducting a liquid. EP 2 113 991 A1 discloses that the winding heads are embedded into a casting compound, by way of which electric insulation and heat transfer, for example to a cap which is placed onto the cast winding heads, are brought about. Here, the cap is formed from highly thermally conductive material, such as copper or aluminum.

By way of the impregnation or casting of the winding heads with the casting compound, however, wetting of non-exposed winding conductors of the winding heads is prevented or reduced greatly. The encapsulation of the winding heads which is formed by way of the casting compound with an electrically insulating material therefore usually leads necessarily in the winding head to a thermal insulation of inner winding conductors. The cooling action is therefore restricted to the outer regions of the winding head region.

It is an object of the present invention to provide efficient and easily realizable cooling for a winding head of a stator of an electric machine of a motor vehicle.

According to the invention, the object is achieved by way of a cooling cap, a stator and a motor vehicle having the features according to the respective independent patent claims. Advantageous embodiments of the invention are the subject matter of the dependent patent claims, the description and the figures.

A cooling cap according to the invention for a stator of an electric machine of a motor vehicle can be placed onto a winding head of electric windings of the stator which protrude beyond an axial end of a laminated core of the stator. The cooling cap is configured as a cooling element for cooling the winding head. Moreover, the cooling cap is formed at least in regions from an electric insulation material.

The electric machine is, in particular, a drive unit for a motor vehicle in the form of an electric or hybrid vehicle. The electric machine comprises the stator which comprises a hollow-cylindrical laminated core and the electric windings. A rotor is mounted rotatably within the cylindrical inner region which is formed by way of the laminated core, a rotational axis of the rotor corresponding to a longitudinal axis of the hollow-cylindrical laminated core. The rotor is therefore enclosed by the stator in the radial direction, i.e., perpendicularly with respect to the rotational axis. In the axial direction, along the rotational axis, the windings protrude beyond the laminated core and configure a crown-shaped or annular winding head there. The windings of the stator are configured, in particular, as rod windings, for example, round wire windings or shaped rod windings. The winding conductors of the windings are configured as bent rods, the winding head being formed by way of rod ends which protrude beyond the laminated core.

In order to cool the winding head, the cooling cap can be placed onto the winding head. The cooling cap serves to discharge waste heat or heat loss from the electric machine to a surrounding area of the electric machine, e.g., to the ambient air. The cooling cap is, in particular, a passive cooling element which outputs the waste heat to the surroundings predominantly by way of convection. Here, the cooling cap is, in particular, a concrete component which can be placed in its entirety and without a change to its physical state onto the winding head. In particular, the cooling cap is configured such that it can be detached in a non-destructive manner, and can again be removed or taken off in its entirety from the winding head. The cooling cap is therefore, in particular, not a casting compound which is arranged on the winding head by way of overmolding or impregnation of the winding head.

The cooling cap is configured from a highly thermally conductive material. A highly thermally conductive material has, in particular, a thermal conductivity of at least 10 W/(m*K). Moreover, the cooling cap is formed at least in regions from the electric insulation material. In particular, the cooling cap is configured predominantly, preferably completely, from the electric insulation material. This means that the highly thermally conductive material of the cooling cap is at the same time an electrically non-conducting or insulating material. The material, from which the cooling cap is formed, therefore has, in particular, a high thermal conductivity and a negligible electric conductivity. Moreover, in particular, the material is non-magnetic or non-ferromagnetic and therefore magnetically inactive. The cooling cap is particularly preferably formed at least in regions from a technical ceramic and/or aluminum oxide and/or thermoset.

The cooling cap can therefore be configured as a cooling element for cooling the winding head and an electric insulator for electrically insulating the winding head. The cooling cap can be arranged so as to bear at least in regions against the winding head. Although the winding head can additionally be encapsulated with a casting compound, the encapsulation for reasons of the electric insulation is no longer necessary. The winding head can therefore be configured so as to be non-cast or without casting compound. It can be prevented as a result that regions of the winding head are insulated thermally by way of the casting compound which is usually deployed for the electric insulation, and a dissipation of the heat is therefore blocked. As a result of the electrically insulating cooling cap, the cooling cap can also make contact with the winding head with the configuration of as great a contact area as possible for heat dissipation. The cooling cap can therefore reliably dissipate the waste heat to the surroundings from the winding head, and also from inner regions of the winding head and/or regions of the winding head which are not accessible or can be accessed only with difficulty. Moreover, a cooling cap of this type can be manufactured simply and without great complexity, and can be mounted on the stator by way of being placed onto the winding head.

In accordance with a first embodiment of the invention, the cooling cap comprises an annular cover with an annular depression for receiving the winding head, the annular depression being formed by way of a cylindrical inner wall, a cylindrical outer wall which lies radially opposite the inner wall, and an axial annular cover side. A cylindrical wall is to be understood to mean a completely circumferential wall around the longitudinal axis of the stator. A surface of the wall does not necessarily have to be planar or stepless. In accordance with the first embodiment, the cooling cap is configured, in particular, in one part or in one piece as the cover. The annular cover is placed onto the winding head or pushed over the winding head in such a way that the winding head is arranged completely in the depression along a circumferential direction about the longitudinal axis of the stator. The cover side is therefore, in particular, of completely overlapping configuration with an axial end side of the winding head. The inner wall is at a first radial spacing from the longitudinal axis of the stator, and the outer wall is at a second radial spacing from the longitudinal axis of the stator, which second radial spacing is greater than the first radial spacing. The inner wall, the winding head and the outer wall are therefore arranged concentrically with respect to one another. A height of the inner wall and the outer wall of the cover in the axial direction is, in particular, at most as great as a height of the winding head in the axial direction. The cover can be manufactured with particularly small dimensions by virtue of the fact that the annular cover is formed from the electrically insulating material or the insulation material and therefore does not necessarily have to be arranged spaced apart from the winding head. The cooling cap therefore has a particularly space-saving configuration.

In accordance with a second embodiment of the invention, the cooling cap comprises at least one ring segment-shaped cover element with a ring segment-shaped depression for partially receiving the winding head, the ring segment-shaped depression being formed by way of a cylinder segment-shaped inner wall, a cylinder segment-shaped outer wall which lies radially opposite the inner wall, and an axial ring segment-shaped cover side. A cylinder segment-shaped wall is to be understood to mean a partially circumferential wall about the longitudinal axis of the stator. A surface of the wall does not necessarily have to be planar or stepless. In accordance with the second embodiment, the cooling cap can be of multiple-piece or multiple-part configuration and can comprise a plurality of ring segment-shaped cover elements. In a manner which is spaced apart from one another, in particular, the cover elements can then be pushed over the winding head or can be placed onto the winding head in defined regions of the winding head. The regions correspond, in particular, to hotspots of the winding head, in which hotspots the winding head is heated in a particularly pronounced manner. A cooling cap which is configured in this way only for regions of the winding head can be manufactured in a particularly material-saving manner.

In one development of the embodiments, the cooling cap comprises at least one cooling fin for arranging in at least one clearance of the winding head between winding conductors of the windings. The at least one cooling fin can be arranged, for example, on an inner side of the cooling cap which is configured as a cover or as a cover element, which inner side faces the depression. The at least one cooling fin can be configured in one part with the cover or the at least one cover element. The cooling fins can be arranged on an inner face of the cover side, which inner face faces the winding head, and extend in the axial direction into the depression. The cooling fins can also be arranged on inner faces of the inner wall and/or the outer wall, which inner faces face the winding head, and can extend in the radial direction into the depression. It can also be provided that the at least one cooling fin is arranged as a separate part of the cooling cap in the at least one clearance and is cast there.

The at least one cooling fin or cooling rib can be, for example, of plate-shaped or pin-shaped configuration. The at least one cooling fin is configured, in particular, from the highly thermally conductive, electrically insulating and non-magnetic material. In particular, winding conductors in the form of rods have clearances, for example, between a rod ring which lies on the inside in the radial direction and a rod ring which lies on the outside in the radial direction and/or between rod ends of the rods, which rod ends are arranged in the circumferential direction. The cooling fins can be arranged in the clearances or intermediate spaces and are therefore heat dissipating inserts, by way of which waste heat can be dissipated reliably even from winding regions which face away from the cooling cap.

It proves to be advantageous if the cooling cap comprises at least one embossment, by way of which at least one receiving space for an interconnection of the stator is formed on a surface of the cooling cap, which surface faces the winding head. The interconnection can comprise, for example, phase connectors with phase connector lines and winding connectors. The phase lines are connected electrically to the respective winding connector. A respective phase current can be fed to the windings via the phase connector lines and the winding connectors. In the case of the shaped rod winding, a winding connector can be configured as a rod end which protrudes beyond the other rods in the axial direction and to which the phase connector lines are connected. For the winding connectors and phase connector lines, the cooling cap can comprise the receiving spaces which are configured by way of the embossments and by way of which the winding connectors and phase connector lines are arranged within the cooling cap. For example, the at least one embossment can be configured on the cover side and/or on the inner wall and/or on the outer wall, with the result that the receiving space is configured in the depression.

In one development of the invention, the cooling cap comprises at least one positioning element for positioning the cooling cap on the winding head. The positioning element can be configured, for example, as a positioning face in the inner wall and/or the outer wall of the cover or of the at least one cover element. For example, the at least one positioning element of the cooling cap can enter into a releasable connection with a corresponding positioning element on the stator. A positioning element of this type of the cooling cap can be a groove or slotted guide, in which a counterpiece which is situated on the stator can be arranged. By way of the at least one positioning element, the cooling cap can be positioned or arranged on the winding head in a particularly simple manner.

It can be provided that a surface structure which is dependent on a predefine pain rotational direction of a rotor of the electric machine, which rotor is mounted in the inner region, is configured on a surface of the cooling cap, which surface faces an inner region of the stator, which surface structure is designed, in the case of operation of the rotor in the main rotational direction, to discharge oil in the axial direction out of an air gap between the stator and the rotor. The surface structure can comprise, for example, grooves or drain grooves which extend in the radial direction along the surface, for example, the surface of the inner wall which is assigned to the air gap, and bring about a conveying action for the oil outflow from the air gap together with the main rotational direction of the rotor. In this way, a friction which occurs in the air gap between the rotor and the stator and is caused by way of oil which is situated in the air gap can be prevented.

Moreover, the invention relates to a stator for an electric machine of a motor vehicle having at least one cooling cap according to the invention or an advantageous embodiment thereof. The stator comprises a hollow-cylindrical laminated core and electric windings which are configured so as to protrude out of the laminated core and beyond at least one axial end of the laminated core with the configuration of a respective winding head of the windings. The at least one cooling cap is placed onto the at least one winding head. The windings of the stator are preferably configured as rod windings, for example, round wire windings or shaped rod windings, and the at least one winding head is formed by way of rod ends which protrude beyond the laminated core. In particular, the cooling cap surrounds the rod ends at least in regions.

It proves to be advantageous if the at least one cooling cap for cooling the at least one winding head is thermally coupled to at least one cooling face of the electric machine. The at least one cooling face can bear, for example, against an outer side of the inner wall and/or outer wall, which outer side faces the surroundings, and/or the cover side of the cover or cover element. The cooling cap can dissipate the waste heat which is absorbed from the winding head to the cooling faces. The cooling faces can be cooled by way of a cooling medium, for example air. Here, a surface of the cooling faces can comprise a surface structure which wets the surface in order to distribute the cooling medium. The cooling faces can also be configured by way of a cooled housing of the electric machine.

A motor vehicle according to the invention comprises an electric machine having a stator according to the invention. The motor vehicle is configured, in particular, as an electric vehicle or a hybrid vehicle which comprises the electric machine for driving the motor vehicle.

The embodiments which are proposed in relation to the cooling cap according to the invention and the advantages thereof apply correspondingly to the stator according to the invention and to the motor vehicle according to the invention.

Further features of the invention result from the claims, the figures and the description of the figures. The features and combinations of features which are mentioned above in the description and the features and combinations of features which are mentioned below in the description of the figures and/or are shown solely in the figures can be used not only in the respective specified combination, but rather also in other combinations or on their own.

The invention will now be described in greater detail on the basis of one preferred exemplary embodiment and with reference to the drawings.

Other objects, advantages and novel features of the present invention will become apparent from the following detailed description of one or more preferred embodiments when considered in conjunction with the accompanying drawings.

DETAILED DESCRIPTION OF THE DRAWINGS

In the figures, identical and functionally identical elements are provided with the same designations.

Figure 1:
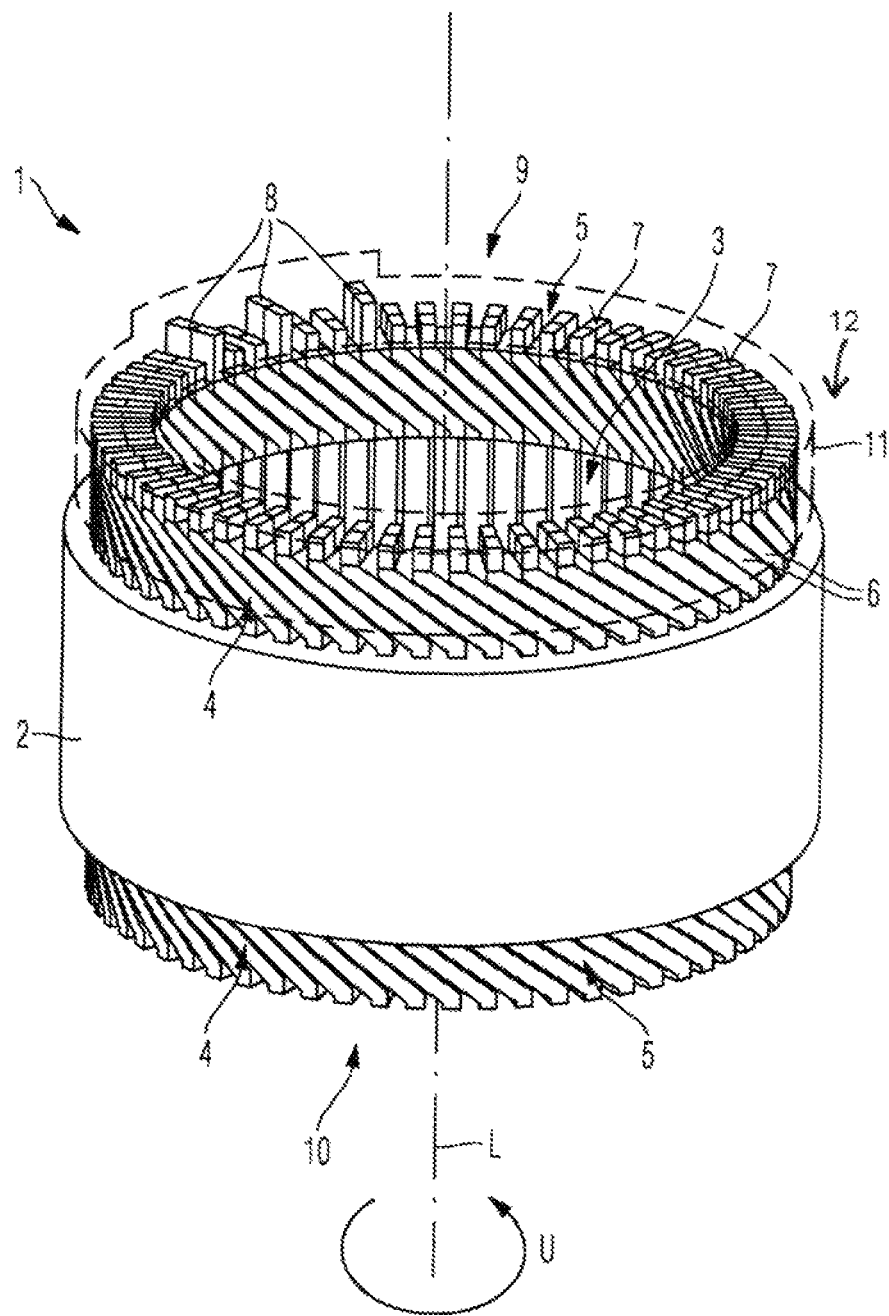
FIG. 1 shows a diagrammatic illustration of one embodiment of a stator according to the invention.

FIG. 1 shows a diagrammatic and simplified illustration of a stator 1 for an electric machine (not shown here) of a motor vehicle. The electric machine can be, for example, an electric drive motor for a motor vehicle which is configured as an electric vehicle or a hybrid vehicle. The stator 1 has a hollow-cylindrical laminated core 2 which runs around a longitudinal axis L of the stator 1 along a circumferential direction U. The longitudinal axis L also corresponds to a rotational axis, about which a rotor (not shown here) which is mounted within a cylindrical inner region 3 of the stator 1 rotates. Moreover, the stator 1 has electric windings 4 which protrude beyond the laminated core 2 at axial ends 9, 10 of the laminated core 2 and configure a winding head 5 there. The windings 4 are configured as shaped rod windings which have a multiplicity of curved shaped rods 6 which are arranged in a ring-shaped or annular manner. An interconnection (not shown here) of the stator 1 can be arranged on end sides 7 of the shaped rods 6, by way of which an axial end side of the winding head 5 is formed, in the case of which interconnection phase connector lines (not shown here) are routed to winding connectors 8 of the windings 4. A phase current can be fed to the windings 4 via the phase connector lines and the winding connectors 8.

Moreover, the stator 1 has a cooling cap 11 which is shown in a transparent manner here for improved visibility. The cooling cap 11 is placed onto the winding head 5 (here, onto the winding head 5 at a first axial end 9 of the laminated core 2). A further cooling cap 11 can also be placed onto the winding head 5 at a second axial end 10 of the laminated core 2, which second axial end 10 lies opposite the first axial end 9. The cooling cap 11 is designed to cool the winding head 5, by the cooling cap 11 dissipating waste heat or heat loss which is produced during operation of the electric machine from the winding head 5, for example, to a surrounding area 12 of the stator 1. The cooling cap 11 can also dissipate the waste heat to a cooled face of the electric machine, for example, to a housing (not shown here) of the electric machine and/or to ventilated cooling faces. The ventilated cooling faces can be situated, for example, in the inner region 3 and can be coupled thermally to the cooling cap 11. The cooling cap 11 is formed at least in regions, in particular completely, from an electric insulating material. To this end, the cooling cap 11 is manufactured, in particular, from a thermally highly conductive, electrically insulating and non-magnetic material. The cooling cap 11 can be formed, for example, from a technical ceramic, aluminum oxide or thermoset. As a result of the negligible electric conductivity of the cooling cap 11, casting of the winding head 5 with an electrically insulating casting compound can be dispensed with, and the cooling cap 11 can be arranged on the winding head 5 in a particularly space-saving manner.

Figure 2:
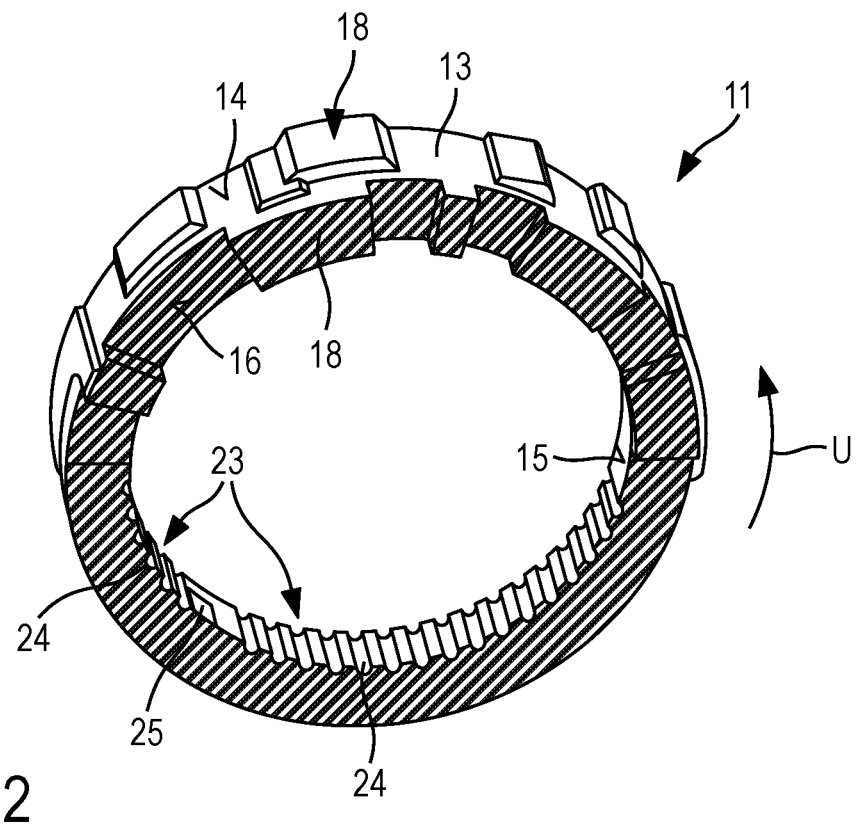
FIG. 2 shows a diagrammatic outer view of one embodiment of a cooling cap according to the invention.
Figure 3:
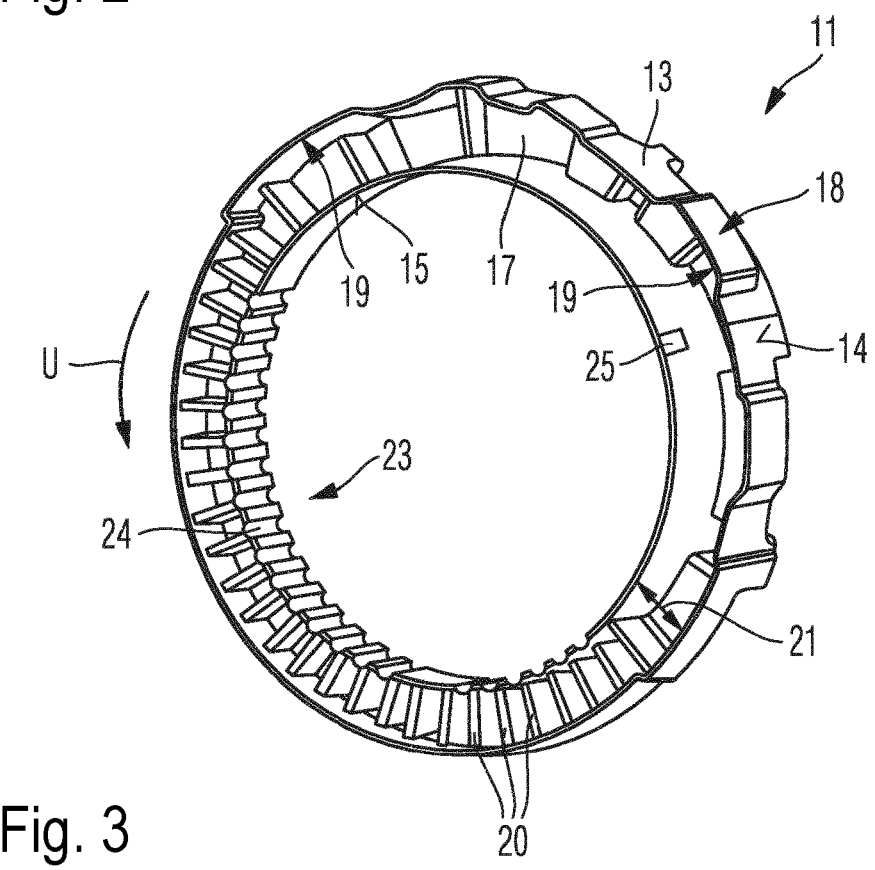
FIG. 3 shows a diagrammatic inner view of the cooling cap according to FIG. 2.

FIG. 2 shows an outer view and FIG. 3 shows an inner view of one embodiment of the cooling cap 11. The cooling cap 11 is configured as an annular cover 13 which runs around completely in the circumferential direction U. The annular cover 13 has a cylindrical outer wall 14, a cylindrical inner wall 15 and an annular cover side 16. In the mounted state of the cover 13, the outer wall 14 faces the surroundings 12 and the inner wall 15 faces the inner region 3. An annular depression 17 is configured by way of the outer wall 14, the inner wall 15 and the cover side 16, in which annular depression 17 the winding head 5 is arranged. It can also be provided, however, that the cooling cap 11 is formed by way of at least one ring segment-shaped cover element, by the outer wall 14 and the inner wall 15 being of cylinder segment-shaped configuration and the cover side 16 being of ring segment-shaped configuration.

Here, moreover, the cover 13 has embossments 18 in the inner wall 14, the outer wall 15 and the cover side 16, by way of which embossments 18 receiving spaces 19 or chambers for receiving the interconnection, that is to say the phase connector lines and the winding connectors 8, are formed in the depression 17. A surface contour of the cooling cap 11 therefore follows, in particular, a surface contour of the winding head 5.

Figure 4:
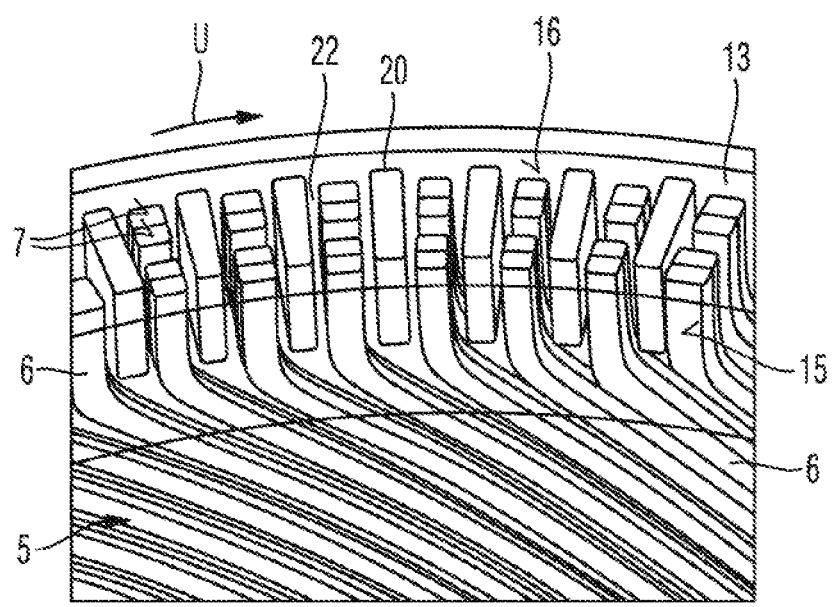
FIG. 4 shows a diagrammatic illustration of a further detail of the winding head of the stator with the cooling cap placed onto it.

Moreover, the cover 13 has cooling fins 20 which are configured so as to protrude into the depression 17. The cooling fins 20 are configured, in particular, in one piece or in one part with the cover 13. The cooling fins 20 are of plate-shaped configuration and extend over an entire radial width 21 of the depression 17. It can also be provided, however, that the cooling fins 20 extend only over a part of the radial width 21 of the depression 17. The cooling fins 20 can also be of pin-shaped configuration. A surface area of the cooling cap 11 is enlarged by way of the cooling fins 20. The cooling fins 20 are configured, in particular, from the highly thermally conductive, electrically insulating and non-magnetic material. FIG. 4 shows a detail, in the case of which the cooling fins 20 are arranged in clearances 22 of the winding head 5. The clearances 22 are situated between the shaped rods 6 which are adjacent in the circumferential direction U. The cooling fins 20 are therefore configured as heat dissipation inserts.

Here, moreover, the inner wall 15 has a surface structure 23 on a side which faces the inner region 3 (that is to say, which faces away from the depression 17), by way of which surface structure 23 oil can be discharged from the inner region 3 into the surroundings 12. The surface structure 23 is formed by way of axial grooves 24 which discharge the oil. The grooves 24 have a course which corresponds to a main rotational direction of the rotor, with the result that the oil is discharged at a predefined axial end of the stator 1 during operation of the rotor.

LIST OF DESIGNATIONS

1 Stator
2 Laminated core
3 Inner region
4 Windings
5 Winding head
6 Shaped rod
7 End side
8 Winding connector
9 First axial end
10 Second axial end
11 Cooling cap
12 Surroundings
13 Cover
14 Outer wall
15 Inner wall
16 Cover side
17 Depression
18 Embossment
19 Receiving space
20 Cooling fin
21 Width
22 Clearance
23 Surface structure
24 Groove
25 L Longitudinal axis
26 U Circumferential direction The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A cooling cap for a stator of an electric machine of a motor vehicle, the cooling cap having a structure that can be placed onto a winding head of electric windings of the stator, the electric windings being configured to protrude beyond an axial end of a laminated core of the stator, and the cooling cap is configured as a cooling element for cooling the winding head, wherein the cooling cap is formed, at least in regions thereof, from an electric insulation material;
   wherein a surface structure which is dependent on a predefined main rotational direction of a rotor of the electric machine, is configured on a surface of the cooling cap facing an inner region of the stator, the surface structure is designed, in the case of operation of the rotor in the predefined main rotational direction, to discharge oil in an axial direction out of an air gap between the stator and the rotor, and the rotor is mounted in the inner region.

2. The cooling cap according to claim 1, wherein the cooling cap is formed, at least in the regions thereof, from at least one of a technical ceramic, an aluminum oxide, and a thermoset.

3. The cooling cap according to claim 1, wherein the cooling cap comprises an annular cover with an annular depression for receiving the winding head, the annular depression being formed by way of a cylindrical inner wall, a cylindrical outer wall which lies radially opposite the cylindrical inner wall, and an axial annular cover side.

4. The cooling cap according to claim 1, wherein the cooling cap comprises at least one ring segment-shaped cover element with a ring segment-shaped depression for partially receiving the winding head, the ring segment-shaped depression being formed by way of a cylinder segment-shaped inner wall, a cylinder segment-shaped outer wall which lies radially opposite the cylinder segment-shaped inner wall, and an axial ring segment-shaped cover side.

5. The cooling cap according to claim 1, wherein the cooling cap comprises at least one cooling fin for arranging in at least one clearance of the winding head between winding conductors of the windings.

6. The cooling cap according to claim 1, wherein the cooling cap comprises at least one embossment, by way of which at least one receiving space for an interconnection of the stator is formed on a surface of the cooling cap facing the winding head.

7. The cooling cap according to claim 1, wherein the cooling cap comprises at least one positioning element for positioning the cooling cap on the winding head.

8. A stator for an electric machine of a motor vehicle having a hollow-cylindrical laminated core and electric windings which are configured so as to protrude beyond at least one axial end of the hollow-cylindrical laminated core with a configuration of a winding head, and having a cooling cap, the cooling cap having a structure that can be placed onto the winding head, the electric windings being configured to protrude beyond an axial end of the hollow-cylindrical laminated core of the stator, and the cooling cap being configured as a cooling element for cooling the winding head, wherein the cooling cap is formed, at least in regions thereof, from an electric insulation material, and wherein the cooling cap is placed on the winding head;
  wherein a surface structure which is dependent on a predefined main rotational direction of a rotor of the electric machine, is configured on a surface of the cooling cap facing an inner region of the stator, the surface structure is designed, in the case of operation of the rotor in the predefined main rotational direction, to discharge oil in an axial direction out of an air gap between the stator and the rotor, and the rotor is mounted in the inner region.

9. The stator according to claim 8, wherein the cooling cap is formed, at least in the regions thereof, from at least one of a technical ceramic, an aluminum oxide, and a thermoset.

10. The stator according to claim 8, wherein the cooling cap comprises an annular cover with an annular depression for receiving the winding head, the annular depression being formed by way of a cylindrical inner wall, a cylindrical outer wall which lies radially opposite the cylindrical inner wall, and an axial annular cover side.

11. The stator according to claim 8, wherein the cooling cap comprises at least one ring segment-shaped cover element with a ring segment-shaped depression for partially receiving the winding head, the rin-g segment-shaped depression being formed by way of a cylinder segment-shaped inner wall, a cylinder segment-shaped outer wall which lies radially opposite the cylinder segment-shaped inner wall, and an axial ring segment-shaped cover side.

12. The stator according to claim 8, wherein the cooling cap comprises at least one cooling fin for arranging in at least one clearance of the winding head between winding conductors of the windings.

13. The stator according to claim 8, wherein the cooling cap comprises at least one embossment, by way of which at least one receiving space for an interconnection of the stator is formed on a surface of the cooling cap facing the winding head.

14. The stator according to claim 8, wherein the cooling cap comprises at least one positioning element for positioning the cooling cap on the winding head.

15. A motor vehicle having an electric machine comprising a stator having a hollow-cylindrical laminated core and electric windings which are configured so as to protrude beyond at least one axial end of the hollow-cylindrical laminated core with a configuration of a winding head, and having a cooling cap, the cooling cap having a structure that can be placed onto the winding head, the electric windings being configured to protrude beyond an axial end of the hollow-cylindrical laminated core of the stator, and the cooling cap being configured as a cooling element for cooling the winding head, wherein the cooling cap is formed, at least in regions thereof, from an electric insulation material, and wherein the cooling cap is placed on the winding head;
  wherein a surface structure which is dependent on a predefined main rotational direction of a rotor of the electric machine, is configured on a surface of the cooling cap facing an inner region of the stator, the surface structure is designed, in the case of operation of the rotor in the predefined main rotational direction, to discharge oil in an axial direction out of an air gap between the stator and the rotor, and the rotor is mounted in the inner region.

16. The motor vehicle according to claim 15, wherein the cooling cap is formed, at least in the regions thereof, from at least one of a technical ceramic, an aluminum oxide, and a thermoset.

17. The motor vehicle according to claim 15, wherein the cooling cap comprises an annular cover with an annular depression for receiving the winding head, the annular depression being formed by way of a cylindrical inner wall, a cylindrical outer wall which lies radially opposite the cylindrical inner wall, and an axial annular cover side.

18. The motor vehicle according to claim 15, wherein the cooling cap comprises at least one ring segment-shaped cover element with a ring segment-shaped depression for partially receiving the winding head, the ring segment-shaped depression being formed by way of a cylinder segment-shaped inner wall, a cylinder segment-shaped outer wall which lies radially opposite the cylinder segment-shaped inner wall, and an axial ring segment-shaped cover side.

* * * * *